(12) United States Patent
Xin et al.

(10) Patent No.: US 7,812,522 B2
(45) Date of Patent: Oct. 12, 2010

(54) ALUMINUM OXIDE AND ALUMINUM OXYNITRIDE LAYERS FOR USE WITH PHOSPHORS FOR ELECTROLUMINESCENT DISPLAYS

(75) Inventors: Yongbao Xin, Mississauga (CA); Isao Yoshida, Ibaraki (JP); Joe Acchione, Caledon (CA); Hiroki Hamada, Hirakata (JP)

(73) Assignee: iFire IP Corporation, Oakville, Ontario (CA)

( * ) Notice: Subject to any disclaimer, the term of this patent is extended or adjusted under 35 U.S.C. 154(b) by 0 days.

(21) Appl. No.: 11/184,457

(22) Filed: Jul. 19, 2005

(65) Prior Publication Data

US 2006/0017381 A1    Jan. 26, 2006

Related U.S. Application Data

(60) Provisional application No. 60/589,801, filed on Jul. 22, 2004.

(51) Int. Cl.
    *H01J 1/62*      (2006.01)
(52) U.S. Cl. .................. 313/506; 313/502; 313/503; 313/509
(58) Field of Classification Search .......... 313/498–512
    See application file for complete search history.

(56) References Cited

U.S. PATENT DOCUMENTS

| | | | |
|---|---|---|---|
| 4,209,705 A | 6/1980 | Washida et al. |
| 4,751,427 A | 6/1988 | Barrow et al. |
| 4,975,338 A | 12/1990 | Kageyama et al. |
| 5,229,628 A | 7/1993 | Kobayashi et al. |
| 5,244,750 A | 9/1993 | Reilly et al. |
| 5,432,015 A | 7/1995 | Wu et al. |
| 5,496,597 A | 3/1996 | Soininen et al. |
| 5,598,059 A | 1/1997 | Sun et al. |
| 5,858,561 A | 1/1999 | Epstein et al. |
| 6,113,977 A | 9/2000 | Soininen et al. |
| 6,146,225 A | 11/2000 | Sheats et al. |
| 6,358,632 B1 | 3/2002 | Dickey et al. |
| 6,383,048 B1 | 5/2002 | Yang et al. |
| 6,416,888 B1 | 7/2002 | Kawamura et al. |

(Continued)

FOREIGN PATENT DOCUMENTS

CA      2434335      7/2002

(Continued)

OTHER PUBLICATIONS

PCT International Search Report; PCT/CA2005/001151; mailed Nov. 10, 2005.

(Continued)

*Primary Examiner*—Bumsuk Won
(74) *Attorney, Agent, or Firm*—Fay Sharpe LLP

(57) ABSTRACT

A novel laminate is provided to improve the operating stability of thioaluminate based phosphors used in ac thick film dielectric electroluminescent displays. The novel structure comprises a rare earth activated alkaline earth thioaluminate phosphor thin film layer and an aluminum oxide or aluminum oxynitride layer provided directly adjacent and in contact with the bottom of the phosphor thin film layer. The invention is particularly applicable to phosphors used in electroluminescent displays that employ thick dielectric layers subject to high processing temperatures to form and activate the phosphor films.

37 Claims, 2 Drawing Sheets

U.S. PATENT DOCUMENTS

| | | |
|---|---|---|
| 6,447,654 B1 * | 9/2002 | Kosyachkov ............ 204/192.15 |
| 6,576,482 B1 | 6/2003 | Aggarwal et al. |
| 6,589,674 B2 * | 7/2003 | Li et al. ....................... 428/690 |
| 6,650,047 B2 | 11/2003 | Aoki et al. |
| 6,699,596 B2 * | 3/2004 | Yano et al. .................. 428/690 |
| 6,734,622 B1 | 5/2004 | Kanitz et al. |
| 6,743,475 B2 | 6/2004 | Skarp et al. |
| 2002/0031688 A1 | 3/2002 | Tanabe et al. |
| 2002/0079836 A1 | 6/2002 | Tanabe et al. |
| 2002/0094451 A1 * | 7/2002 | Li et al. ....................... 428/690 |
| 2002/0106451 A1 | 8/2002 | Skarp et al. |
| 2002/0125821 A1 | 9/2002 | Steckl et al. |
| 2002/0155320 A1 | 10/2002 | Park et al. |
| 2002/0177008 A1 | 11/2002 | Shirakawa et al. |
| 2003/0118864 A1 | 6/2003 | Kosyachkov |
| 2003/0146691 A1 * | 8/2003 | Yano et al. .................. 313/503 |
| 2003/0160247 A1 | 8/2003 | Miyazawa |
| 2004/0046498 A1 | 3/2004 | Aoki et al. |
| 2004/0080263 A1 | 4/2004 | Yamazaki et al. |
| 2004/0113547 A1 | 6/2004 | Son et al. |
| 2004/0115859 A1 | 6/2004 | Murayama et al. |
| 2004/0135495 A1 * | 7/2004 | Wu et al. ..................... 313/503 |
| 2004/0170864 A1 * | 9/2004 | Liu ............................... 428/690 |
| 2004/0206935 A1 * | 10/2004 | Miura et al. ............ 252/301.4 S |
| 2006/0250082 A1 * | 11/2006 | Yoshida et al. .............. 313/509 |

FOREIGN PATENT DOCUMENTS

| | | |
|---|---|---|
| CA | 2434335 A1 | 7/2002 |
| CA | 2469508 | 7/2003 |
| CA | 2469508 A1 | 7/2003 |
| CA | 2478439 | 10/2003 |
| CA | 2478439 A1 | 10/2003 |
| CA | 2482833 | 10/2003 |
| CA | 2482833 A1 | 10/2003 |
| CA | 2495771 | 3/2004 |
| CA | 2495771 A1 | 3/2004 |
| JP | 02-103893 | 4/1990 |
| JP | 08-288069 | 11/1996 |
| JP | 10-092580 | 4/1998 |
| JP | 2003-332081 | 11/2003 |
| WO | WO03/055636 A1 | 7/2003 |
| WO | WO2004/036961 A2 | 4/2004 |
| WO | WO 2004/057925 | 7/2004 |

OTHER PUBLICATIONS

PCT International Search Report, Nov. 10, 2005.
Supplementary European Search Report dated Jul. 16, 2008.

* cited by examiner

ALUMINUM OXIDE AND ALUMINUM OXYNITRIDE LAYERS FOR USE WITH PHOSPHORS FOR ELECTROLUMINESCENT DISPLAYS

This application claims the benefit of U.S. Provisional Application Ser. No. 60/589,801, filed Jul. 22, 2004.

FIELD OF THE INVENTION

The present invention relates to improving the operating stability of blue light-emitting phosphor materials used for full color ac electroluminescent displays employing thick film dielectric layers with a high dielectric constant. More specifically, the invention provides aluminum oxide or aluminum oxynitride layers in contact with the phosphor layer to prevent phosphor degradation.

BACKGROUND OF THE INVENTION

The thick film dielectric structure provides for superior resistance to dielectric breakdown as well as a reduced operating voltage as compared to thin film electroluminescent (TFEL) displays, as exemplified by U.S. Pat. No. 5,432,015. The thick film dielectric structure also enhances the amount of charge that can be injected in to the phosphor film to provide greater luminosity than can be realized from TFEL displays. Full colour thick dielectric electroluminescent displays are described for example in the Applicant's PCT CA03/01567. These displays employ high luminance blue phosphor materials to directly illuminate blue sub-pixels and colour conversion materials to down-convert the blue light to red or green light for the red and green sub-pixels. While these thick film electroluminescent structures meet the luminosity and colour spectrum capability of cathode ray tube (CRT) based displays, the operating stability still falls short of that provided by CRTs. Therefore, improvements to thick film dielectric structures are desirable.

One area in which improvement is sought is the prevention of the degradation of the phosphor layers used in the thick film dielectric electroluminescent structures. In this regard, various materials have been proposed for use with certain types of phosphor materials. U.S. Pat. Nos. 5,496,597 and 5,598,059 disclose the use of aluminum oxide in conjunction with a terbium doped zinc sulfide for electroluminescent displays. Aluminum nitride has also been proposed for use with EL emitting layers of alkali earth chalcogen compounds in thin film electroluminescent devices as described in U.S. Pat. No. 4,975,338 and JP 02103893. Aluminum nitride has also been used as an insulating thin film layer in organic electroluminescent elements/displays as described in JP 08288069, JP 10092580, U.S. Pat. No. 6,146,225, U.S. Pat. No. 6,383,048 and U.S. Pat. No. 6,416,888 as well as a moisture barrier layer in EL elements as described in U.S. 2002/0079836 and U.S. 2002/0031688. Aluminum nitride as a ceramic substrate has also been proposed as disclosed in U.S. 2002/0177008.

U.S. 2002/0125821 discloses the use of aluminum nitride as a semiconductor material interposed between a conventional manganese activated zinc sulfide phosphor film and a thick film dielectric layer. The device is constructed by annealing the phosphor film, applying a layer of aluminum nitride on top of the annealed phosphor and then screen printing and sintering a thick film dielectric layer thereon such that the aluminum nitride is placed between the phosphor film and the thick film dielectric layer. Aluminum nitride layers are also disclosed art for use as barrier layers in thick dielectric electroluminescent displays. PCT CA02/01891 describes the use of aluminum nitride layers either above or below the phosphor layer in such electroluminescent devices.

Aluminum oxide barriers are disclosed in the prior art as a barrier layer for electroluminescent displays. For example Japanese patent application 2003-332081 discloses an aluminum oxide layer disposed between the thick dielectric layers and the phosphor layer in a thick dielectric electroluminescent device. In the disclosed device the aluminum oxide layer is not in contact with the phosphor layer, but rather a zinc sulfide layer is positioned between the aluminum oxide layer and the phosphor layer.

Aluminum oxide layers are also known to be used in organic electroluminescent devices where such layers are provided adjacent to a phosphor or substrate as described for example in U.S. Pat. Nos. 4,209,705, 4,751,427, 5,229,628, 5,858,561, 6,113,977, 6,358,632 and 6,589,674 as well as in U.S. 2003/0160247 and U.S. 2004/0115859.

While the aforementioned patents and patent applications may teach the use of certain insulator materials such as aluminum nitride in conjunction with conventional zinc sulfide phosphors within thin film or thick film electroluminescent displays, there remains a need to provide further improvements to thick film dielectric electroluminescent displays that will further improve the luminance of phosphors provided therein and also extend their operating life with minimal degradation.

SUMMARY OF THE INVENTION

The present invention is a thin film alkaline earth thioaluminate phosphor doped with a rare earth activator species that has an improved operating life. The improved operating life is achieved by providing an aluminum oxide or aluminum oxynitride layer directly in contact with the bottom portion of the phosphor. The aluminum oxide or aluminum oxynitride layer is therefore positioned between the thick dielectric structure of the display and the phosphor layer so that it is in contact with the phosphor layer.

The aluminum oxide or aluminum oxynitride layer improves the luminance and operating life of the phosphor by acting as a barrier to chemical species that may cause a reduction in the realizable luminance of the phosphor material by causing a reduction in the efficiency with which electrons are injected into the phosphor film during operation of the device. This causes a reduction in the efficiency with which electrons interact with the activator species in the phosphor material to emit light, or reduces the efficiency by which light generated in the phosphor is transmitted from the device to provide useful luminance. The prior art has not contemplated providing an aluminum oxide or aluminum oxynitride layer directly adjacent a lower surface of the phosphor that is between the phosphor and a thick film dielectric layer in an electroluminescent device.

According to an aspect of the present invention there is provided an improved phosphor structure for a thick dielectric film electroluminescent device, said structure comprising;
  a rare earth activated alkaline earth thioaluminate phosphor thin film layer;
  an aluminum oxide or aluminum oxynitride layer provided directly adjacent a bottom of said phosphor thin film layer.

According to still another aspect of the present invention is a phosphor laminate for use in a thick film dielectric electroluminescent display, said laminate comprising;
  (a) a rare earth activated alkaline earth thioaluminate phosphor thin film layer;

(b) an aluminum oxide or aluminum oxynitride layer provided directly adjacent the bottom and in contact with said phosphor thin film layer; and (c) a thick film dielectric layer adjacent a bottom surface of said aluminum oxide or aluminum oxynitride layer.

In aspects, the phosphor laminate may further comprise a layer of barium titanate between (b) and (c). In still other aspects, the phosphor laminate may further comprise a layer of barium tantalate in between the aluminum oxide or aluminum oxynitride layer and the barium titanate layer.

According to still a further aspect of the present invention is a thick film dielectric electroluminescent device comprising:

a thioaluminate phosphor;

a layer of aluminum oxide or aluminum oxynitride directly adjacent a bottom surface of the phosphor; and a thick film dielectric layer adjacent said layer of aluminum oxide or aluminum oxynitride.

According to another aspect of the present invention is a thick film dielectric electroluminescent device comprising:

a thioaluminate phosphor layer of formula $AB_xC_y$:RE where A is at least one of Mg, Ca, Sr or Ba, B is at least one of Al, Ga or In and C is least one of S or Se, $2 \leq x \leq 4$ and $4 \leq y \leq 7$ and RE is selected from cerium and europium; and an aluminum oxide or aluminum oxynitride layer provided directly adjacent a bottom surface of said phosphor layer.

According to yet a further aspect of the present invention is a thick film dielectric electroluminescent device comprising:

a rigid heat resistant substrate;

an electrode layer adjacent a top surface of said substrate;

a thick film dielectric layer adjacent said electrode layer;

a layer of aluminum oxide or aluminum oxynitride adjacent said thick film dielectric layer; and a phosphor layer directly in contact with said layer of aluminum oxide or aluminum oxynitride.

In further aspects, the device may comprise an optional barium titanate layer adjacent the thick film dielectric layer. Still in other aspects, the device may further comprise a layer of barium tantalate adjacent the barium titanate layer and the aluminum oxide or aluminum oxynitride layer.

Other features and advantages of the present invention will become apparent from the following detailed description. It should be understood, however, that the detailed description and the specific examples while indicating embodiments of the invention are given by way of illustration only, since various changes and modifications within the spirit and scope of the invention will become apparent to those skilled in the art from said detailed description.

BRIEF DESCRIPTION OF THE DRAWINGS

The present invention will become more fully understood from the description given herein, and from the accompanying drawings, which are given by way of illustration only and do not limit the intended scope of the invention.

DETAILED DESCRIPTION OF THE INVENTION

Figure 1:
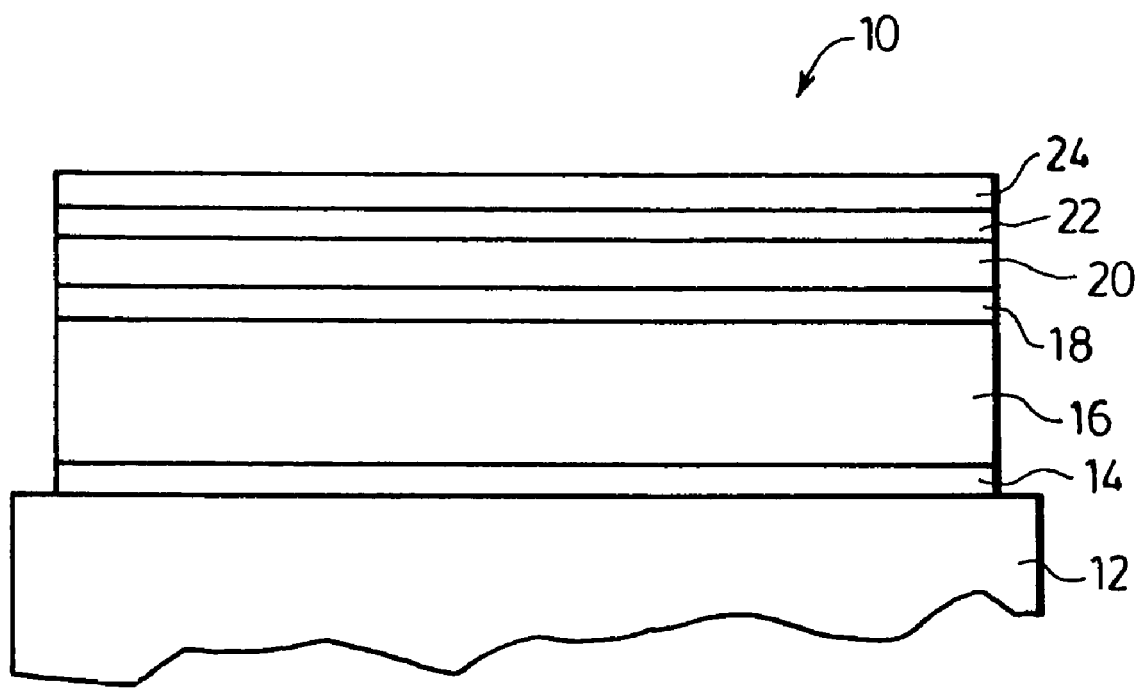
FIG. 1 shows a schematic drawing of the cross section of a thick dielectric electroluminescent device showing the position of aluminum oxide or oxynitride layers of the present invention.

The present invention is a thin film thioaluminate based phosphor thin film layer in a thick dielectric electroluminescent device where the phosphor thin film layer is in direct contact with an aluminum oxide or aluminum oxynitride layer. As such, the aluminum oxide or aluminum oxynitride layer is situated between the phosphor thin film layer and the thick film dielectric layer. FIG. 1 shows a schematic drawing of the cross section of one embodiment of such a device represented, in general, by reference numeral 10. The device 10 comprises a basic structure of, in sequence, a substrate 12, an electrically conductive film layer to form the lower electrode 14, the thick film dielectric layer 16, the aluminum oxide or aluminum oxynitride layer 18, the phosphor thin film layer 20, an upper thin film dielectric layer 22 and an optically transparent but electrically conductive film layer to form the upper electrode 24 in the structure. The lower electrode 14 is typically gold or silver and the upper electrode 24 is a transparent electrically conductive layer, typically, an oxide such as indium tin oxide (ITO). The upper thin film dielectric layer 22 between the phosphor thin film layer 20 and the upper electrode 24 is typically aluminum nitride. The combination of the thick film dielectric layer 16, the aluminum oxide or aluminum oxynitride layer 18, and the phosphor thin film layer 20 may be referred to as a phosphor laminate.

The aluminum oxide or aluminum oxynitride layer 18 has a variety of functions within the thick film dielectric electroluminescent device 10. One function is to minimize migration of oxygen into the phosphor material which may cause performance degradation of the phosphor material during the device operation. Phosphor degradation may involve reaction of oxygen or water with the phosphor material to change the chemical composition of at least a portion of the phosphor material. The aluminum oxide or aluminum oxynitride may reduce the rate of these reactions by acting as a barrier for oxygen originating from within the thick dielectric structure of the device 10. The aluminum oxide or aluminum oxynitride may also serve to nucleate the crystal grains of the phosphor thin film layer 20 when it is deposited so that the grain structure and physical morphology of the phosphor is such to improve its stability or it may act as a stress relief layer between the thick film dielectric layer 16 and the phosphor thin film layer 20 to minimize stress in the phosphor thin film layer 20. It may also act to inhibit electrochemical reactions at the phosphor interfaces during operation when there is an electric potential across the phosphor thin film layer 20 and current flow across the phosphor thin film layer 20.

The aluminum oxide or aluminum oxynitride layer 18 is provided with a thickness of about 20 nm to about 50 nm (and any range therebetween as is understood by one of skill in the art such as 21 nm to 49 nm, 25 nm to 45 nm, etc.) and should be directly adjacent and in direct contact with the lower portion of the phosphor thin film layer 20 such that it is positioned between the phosphor thin film layer 20 and the thick film dielectric layer 16.

The aluminum oxide or aluminum oxynitride layer 18 may be deposited using any suitable vacuum deposition methods that are compatible with the processes used to deposit and anneal the phosphor thin film layer 20. In aspects, the method may be reactive sputtering conducted either in a low pressure nitrogen or low pressure oxygen containing atmosphere, or a mixture of both nitrogen and oxygen atmosphere. A low pressure nitrogen atmosphere may be for example but not limited to an atmosphere where the ratio of argon to nitrogen is within the range of about 4:1 to 1:1 and the working pressure is maintained within the range of about $8\times10^{-4}$ mbar to $6\times10^{-3}$ mbar. In a low pressure oxygen-containing atmosphere for example, the oxygen is incorporated into the thick dielectric electroluminescent device structure to stabilize the thick film dielectric layer 16 and/or the phosphor thin film layer 20, by ensuring that reduced elemental species such as elemental aluminum or elemental sulfur are not present. An example of such a process is reactive sputtering under an oxygen-containing atmosphere.

It is also possible to vary the ratio of nitrogen to oxygen throughout the thickness of the aluminum oxide or aluminum oxynitride layer 18 to optimize its properties. This could be done by separately sputtering thinner layers with different oxygen and nitrogen content, or by continuously varying the ratio of nitrogen to oxygen in the sputtering atmosphere during the sputtering process.

The invention is particularly applicable to electroluminescent devices employing a thick film dielectric layer 16 comprising a high dielectric constant dielectric layer of a thick dielectric material which is a composite material comprising two or more oxide compounds that may evolve oxygen or related chemical species that are deleterious to phosphor performance in response to thermal processing or device operation and wherein the surface of the thick dielectric is rough on the scale of the phosphor thickness resulting in cracks or pinholes through the device structure and wherein the thick film dielectric layer 16 may contain connected voids that may assist in the dispersal of such species, thus contributing to a loss of luminance and operating efficiency over the operating life of the device. Such suitable thick film dielectric layers comprise a lead magnesium niobate (PMN) or lead magnesium niobate titanate (PMN-PT) sintered thick film layer with a smoothing layer of lead zirconate titante (PZT) as is described in U.S. Pat. No. 5,432,015, WO 00/70917 and WO 03/056879 (the disclosures of which are incorporated herein in their entirety).

The thick film dielectric layers are typically constructed on a substrate 12 such as ceramic, glass or glass ceramic substrate where an alumina or aluminum oxynitride layer 18 may act to relieve stress between the phosphor thin film layer 20 and a substrate structure comprising the base substrate 12, a lower electrode 14 and the thick film dielectric layer 16 of the device 10.

The present invention is particularly directed towards improving the operating life of thick dielectric electroluminescent devices incorporating rare earth-activated alkaline earth thioaluminate phosphor materials, especially europium activated barium thioaluminate. While the detailed mechanism for stabilizing these phosphors is not understood, preventing oxygen from reacting with the phosphors may help ensure that the rare earth activator species remain dissolved in the crystal lattice of the host thioaluminate compounds. Reaction of the phosphor with oxygen may cause precipitation of aluminum oxide from the phosphor, causing the remaining material to become more barium rich. It is known many different thioaluminate compounds exist with different ratios of alkaline earth elements to aluminum and different crystal structures for each composition and that not all of them are efficient phosphor hosts. Further, the rare earth species may come out of solution in the host thioaluminate to precipitate as oxysulfide species such as $RE_2O_2S$ where RE represents a rare earth element. The formation of these compounds in a sulfur-bearing environment at very low oxygen partial pressure is well known, as for example described in an article by R. Akila et al in Metallurgical Transactions, Volume 18B (1987) pp. 163-8.

A suitable phosphor for use with the aluminum oxide or aluminum oxynitride layer 18 of the invention is a rare earth activated alkaline earth thioaluminate phosphor thin film layer represented by $AB_xC_y$:RE wherein A is at least one of Mg, Ca, Sr or Ba; in aspects A is Ba or Ba and Mg, B is at least one of Al or In; C is least one of S or Se; and $2 \leq x \leq 4$ and $4 \leq y \leq 7$. In aspects of the invention $2 \leq x \leq 3$ and $4 < y < 5.5$. The RE is one or more rare earth activator species selected from the group consisting of Eu and Ce. In aspects of the invention the phosphor is barium thioaluminate with a ratio of aluminum to barium between about 2 to about 2.5 represented by $BaAl_2S_4$ activated with europium. In other aspects of the invention the phosphor is magnesium barium thioaluminate with a ratio of the atomic concentration of magnesium to barium plus magnesium is in the range of about 0.001 to 0.2. In the case of a barium thioaluminate phosphor, the atomic ratio of europium or cerium to barium or barium plus magnesium is in the range of about 0.005 to about 0.09 and in aspects in the range of about 0.015 to 0.035. The phosphor may additionally comprise oxygen at a relative atomic concentration that is less than 0.2 of the combined S and Se concentrations.

In a specific embodiment of the present invention is an ac electroluminescent device having a thick film dielectric layer and an europium activated barium thioaluminate phosphor thin film layer where the ratio of aluminum to barium is between about 2 and 3 and a thin film aluminum oxide or oxynitride layer is deposited directly on the thick film dielectric layer. The phosphor thin film layer is deposited directly on the aluminum oxide or aluminum oxynitride layer.

In another embodiment of the invention the phosphor composition further comprises magnesium with the ratio of the atomic concentration of magnesium to barium plus magnesium in the range of about 0.001 to 0.2

In a further embodiment of the invention the thick film dielectric layer of the device comprises a lead magnesium niobate (PMN) or lead magnesium niobate titanate (PNM-PT) sintered thick film layer with a smoothing layer of lead zirconate titanate (PZT).

In still a further embodiment of the invention is the provision of a barium titanate ($BaTiO_3$) layer with a thickness in the range of about 100 nm to about 200 nm (and any range therebetween as is understood by one of skill in the art) positioned between and in contact with the PZT smoothing layer and the aluminum oxide or aluminum oxynitride layer.

In yet still another embodiment of the invention a barium tantalate ($BaTa_2O_6$) layer with a thickness in the range of about 30 nm to about 70 nm (and any range therebetween as is understood by one of skill in the art) is provided between and in contact with the barium titanate layer and the aluminum oxide or aluminum oxynitride layer.

The above disclosure generally describes the present invention. A more complete understanding can be obtained by reference to the following specific Examples. These Examples are described solely for purposes of illustration and are not intended to limit the scope of the invention. Changes in form and substitution of equivalents are contemplated as circumstances may suggest or render expedient. Although specific terms have been employed herein, such terms are intended in a descriptive sense and not for purposes of limitation.

EXAMPLES

Example 1

This example serves to illustrate the performance and operating stability of devices of the prior art. A thick dielectric electroluminescent device incorporating thin film phosphor layers comprising barium thioaluminate activated with europium was constructed. The thick film substrate was comprised of a 5 cm by 5 cm glass having a thickness of 0.1 cm. A gold electrode was deposited on the substrate, followed with a lead magnesium niobate-titanate thick film high dielectric constant dielectric layer and a PZT smoothing layer in accordance with the methods exemplified in Applicant's co-pending international application PCT CA00/00561 filed May 12, 2000 (the disclosure of which is incorporated by reference herein in its entirety). A thin film dielectric layer of barium titanate, with a thickness of about 120 nanometers, was deposited in accordance with the methods exemplified in the Applicant's U.S. Pat. No. 6,589,674 (the disclosure of which is incorporated by reference herein in its entirety). A second thin film layer of barium tantalate with a thickness of 50 nanometers was deposited by a sputtering process on top of the barium titanate layer. A phosphor layer consisting of a 400 nanometer thick barium thioaluminate phosphor film activated with about 3 atomic percent of europium with respect to barium was electron beam deposited on the barium tantalate layer according to the methods of Applicant's PCT CA01/01823 filed Dec. 17, 2001 (the disclosure of which is incorporated by reference herein in its entirety).

Following deposition the phosphor was annealed in two steps. The first step was under air in a first pass through a belt furnace at a peak temperature of about 700° C. for about 7 minutes. The second step was a second pass through the belt furnace under nitrogen using the same temperature profile. Next a 50 nanometer thick aluminum nitride layer was sputter-deposited in accordance with the methods exemplified in Applicant's PCT CA02/01891 (the disclosure of which is incorporated by reference herein in its entirety). Finally an indium tin oxide film was sputter deposited to form a second electrode on the device.

Figure 2:
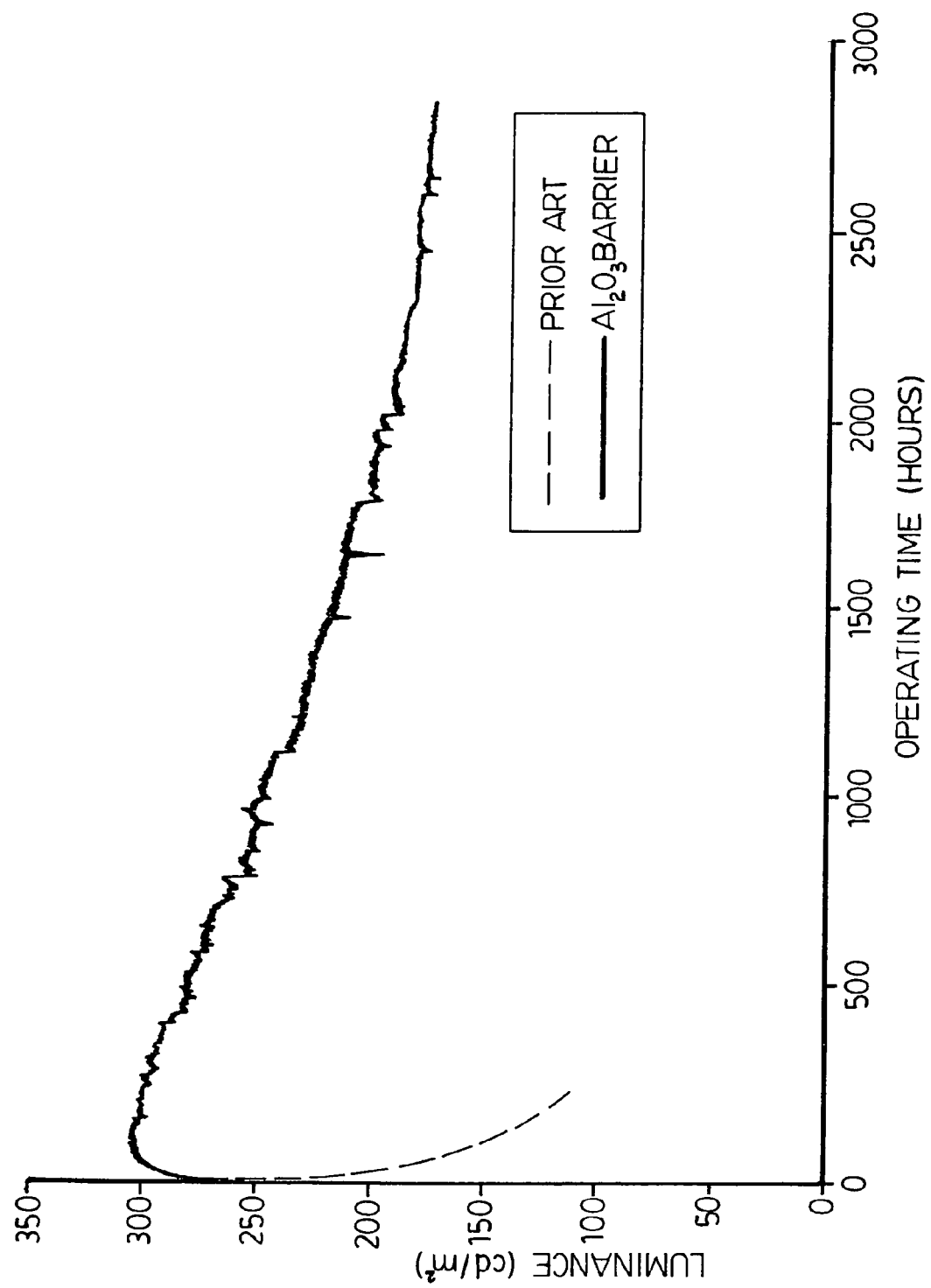
FIG. 2 is a graph showing the luminance as a function of operating time for two electroluminescent devices having a barium thioaluminate phosphor, one with an aluminum oxide layer according to the present invention and the other without the aluminum oxide layer.

The device was tested by applying a 240 Hz alternating polarity square wave voltage waveform with a pulse width of 30 nanoseconds and an of amplitude 60 volts about the optical threshold voltage. FIG. 2 shows the luminance as a function of operating time for the device. As can be seen from the data the initial luminance was about 300 candelas per square meter, but rapidly decreased in the first few hours to about 225 candelas per square meter and then to less than 150 candelas per square meter after 150 hours.

Example 2

This example serves to illustrate the performance and operating stability of devices of the invention in comparison to that of the prior art of example 1. A device was constructed similar to that of example 1, except that an aluminum oxide layer was deposited on the barium tantalate layer prior to phosphor deposition. The luminance data for this device is also shown in FIG. 2 and shows an initial luminance of about 220 candelas per square meter followed by an increase in luminance during the initial hours of operation, followed by a gradual loss of luminance. The luminance after 2800 hours of operation was still about 140 candelas per square meter.

Example 3

This example serves to show the effect of various layers in a thick dielectric electroluminescent devices in inhibiting migration of oxygen into the phosphor film and in improving the performance and stability of the devices with the use of the present invention.

Four devices were constructed, the first and second of which were similar to the devices of examples 1 and 2 respectively, the third of which was similar to that of example 1 except that it did not have the barium tantalate layer and the fourth of which was similar to that of example 2 except that it did not have the barium tantalate layer. Electron Spectroscopy for Chemical Analysis (ESCA) was used to measure the concentration of chemical species with depth in the devices. In particular, the ratio of oxygen to titanium in the PZT smoothing layer was determined to give a measure of changes in the oxygen concentration in the PZT layer. The oxygen to titanium ratio was 9.2±0.3 for the first device which is the prior art device with a barium tantalate layer, but no alumina layer between the PZT layer and the phosphor layer. For the second device that had an alumina layer the oxygen to titanium ratio was 8.0±0.4, similar to that of the first device. These results show that the addition of an alumina layer does not significantly change the oxygen concentration of the PZT layer, so the performance improvement observed for the device of example 2 over that of example 1 cannot be attributed to prevention of loss of oxygen from the PZT. On the other hand, the oxygen to titanium ratio for the third device which is a prior art device without the barium tantalate layer was 5.6±0.8 and the oxygen to titanium ratio for the fourth device which is a similar device without the barium tantalate layer but that includes the alumina layer was 8.6±0.3, so in the absence of the barium tantalate layer, the alumina layer did serve to inhibit migration of oxygen from the PZT layer into the phosphor layer.

These results show that the benefit of the alumina layer of the invention is not just due to inhibition of oxygen incorporation into the phosphor layer, but is due to the chemical interaction between the alumina layer and the phosphor layer in this device structure and/or to the reactive sputtering process carried out in an oxygen-containing low pressure atmosphere that is used to deposit the alumina layer.

Although preferred embodiments of the invention have been described herein in detail, it will be understood by those skilled in the art that variations may be made thereto without departing from the spirit of the invention or the scope of the appended claims.

The invention claimed is:

1. A phosphor laminate for a thick dielectric film electroluminescent device, said laminate comprising:
   a rare earth activated alkaline earth thioaluminate phosphor thin film layer;
   an aluminum oxide or aluminum oxynitride layer having a thickness of 20 nm to 50 nm provided directly adjacent and in contact with a bottom of said phosphor thin film layer;
   a thick film dielectric layer below said aluminum oxide or aluminum oxynitride layer, the thick film dielectric layer comprising a bottom layer and a smoothing layer; and
   a layer of barium titanate provided on top of said smoothing layer.

2. The laminate of claim 1, wherein said phosphor thin film layer is represented by $AB_xC_y$:RE wherein A is at least one of Mg, Ca, Sr or Ba;
B is at least one of Al or In;
C is least one of S or Se;
RE is a rare earth activator species; and
$2 \leq x \leq 4$ and $4 \leq y \leq 7$.

3. The laminate of claim 2, wherein RE is one or more rare earth activator species selected from the group consisting of Eu and Ce.

4. The laminate of claim 3, wherein said phosphor is barium thioaluminate with a ratio of aluminum to barium between about 2 to about 2.5.

5. The laminate of claim 3, wherein said phosphor is magnesium barium thioaluminate with a ratio of the atomic concentration of magnesium to barium plus magnesium is in the range of about 0.001 to 0.2.

6. The laminate of claim 3, wherein the phosphor is activated with trivalent europium or cerium and the atomic ratio of europium or cerium to barium or barium plus magnesium is in the range of about 0.005 to about 0.094.

7. The laminate of claim 3, wherein the phosphor is activated with trivalent europium or cerium and the atomic ratio of europium or cerium to barium or barium plus magnesium is in the range of about 0.015 to 0.035.

8. The laminate of claim 3, wherein said phosphor additionally comprise oxygen at a relative atomic concentration that is less than 0.2 of the combined S and Se concentrations.

9. The laminate of claim 1, wherein said aluminum oxide or aluminum oxynitride layer is adhered to the phosphor thin film structure.

10. The laminate of claim 1, wherein said aluminum oxide or aluminum oxynitride layer is deposited by a vacuum deposition process.

11. The laminate of claim 10, wherein said vacuum deposition process is sputtering.

12. The laminate of claim 11, wherein sputtering is conducted in a low pressure nitrogen atmosphere where the ratio of argon to nitrogen is within the range of about 4:1 to 1:1 and the working pressure is maintained within the range of about $8 \times 10^{-4}$ mbar to $6 \times 10^{-3}$ mbar.

13. The laminate of claim 11, wherein sputtering is conducted in a low pressure oxygen-containing atmosphere.

14. The laminate of claim 11, wherein sputtering is conducted in a low pressure oxygen and nitrogen-containing atmosphere.

15. The laminate of claim 1, wherein said thick film dielectric layer comprises a bottom, layer of lead magnesium niobate (PMN) or lead magnesium niobate titanate (PMN-PT) and a top layer of lead zirconate titanate (PZT) as a smoothing layer.

16. The laminate of claim 1, wherein a further layer of barium tantalate is provided on said layer of barium titanate, said further layer of barium tantalate being directly below said aluminum oxide or aluminum oxynitride layer.

17. The laminate of claim 16, wherein said layer of barium tantalate has a thickness of about 30 nm to about 70 nm.

18. The laminate of claim 1, wherein said layer of barium titanate has a thickness of about 100 nm to about 200 nm.

19. The laminate of claim 1, wherein the bottom layer of said thick film dielectric layer comprises lead magnesium niobate (PMN) or lead magnesium niobate titanate (PMN-PT) and wherein the smoothing layer of said thick film dielectric layer comprises lead zirconate titanate (PZT).

20. A method for improving the luminance and operating life of a alkaline earth thioaluminate phosphor doped with a rare earth activator species in a thick film dielectric electroluminescent device, the method comprising:
providing the laminate of claim 1 within said device.

21. A thick film dielectric electroluminescent device comprising:
a thioaluminate phosphor;
a layer of aluminum oxide or aluminum oxynitride having a thickness of 20 nm to 50 nm directly adjacent a bottom surface of the phosphor;
a thick film dielectric layer below said layer of aluminum oxide or aluminum oxynitride, the thick film dielectric layer comprising a bottom layer and smoothing layer; and
a layer of barium titanate provided on top of said smoothing layer.

22. The device of claim 21, wherein said phosphor is represented by $AB_xC_y$:RE wherein
A is at least one of Mg, Ca, Sr or Ba;
B is at least one of Al or In;
C is least one of S or Se;
RE is a rare earth activator species; and
$2 \leq x \leq 4$ and $4 \leq y \leq 7$.

23. The device of claim 22, wherein RE is one or more rare earth activator species selected from the group consisting of Eu and Ce.

24. The device of claim 23, wherein said phosphor is barium thioaluminate with a ratio of aluminum to barium between about 2 to about 2.5.

25. The device of claim 23, wherein said phosphor is magnesium barium thioaluminate with a ratio of the atomic concentration of magnesium to barium plus magnesium is in the range of about 0.001 to 0.2.

26. The device of claim 23, wherein the phosphor is activated with trivalent europium or cerium and the atomic ratio of europium or cerium to barium or barium plus magnesium is in the range of about 0.005 to about 0.094.

27. The device of claim 23, wherein the phosphor is activated with trivalent europium or cerium and the atomic ratio of europium or cerium to barium or barium plus magnesium is in the range of about 0.015 to 0.035.

28. The device of claim 23, wherein said phosphor additionally comprise oxygen at a relative atomic concentration that is less than 0.2 of the combined S and Se concentrations.

29. The device of claim 21, wherein said layer of aluminum oxide or aluminum oxynitride is adhered to the phosphor.

30. The device of claim 21, wherein said layer of aluminum oxide or aluminum oxynitride is deposited by a vacuum deposition process.

31. The device of claim 30, wherein said vacuum deposition process is sputtering.

32. The device of claim 31, wherein sputtering is conducted in a low pressure nitrogen atmosphere where the ratio of argon to nitrogen is within the range of about 4:1 to 1:1 and the working pressure is maintained within the range of about 8.times.10.sup.-4 mbar to 6.times.10.sup.-3 mbar.

33. The device of claim 31, wherein sputtering is conducted in a low pressure oxygen-containing atmosphere.

34. The device of claim 31, wherein sputtering is conducted in a low pressure oxygen and nitrogen-containing atmosphere.

35. The device of claim 21, wherein a further layer of barium tantalate is provided on said barium titanate layer, said barium tantalate being directly below said layer of aluminum oxide or aluminum oxynitride.

36. The device of claim 35, wherein said layer of barium tantalate has a thickness of about 30 nm to about 70 nm.

37. The device of claim 21, wherein said layer of barium titanate has a thickness of about 100 nm to about 200 nm.

* * * * *

UNITED STATES PATENT AND TRADEMARK OFFICE
CERTIFICATE OF CORRECTION

PATENT NO. : 7,812,522 B2
APPLICATION NO. : 11/184457
DATED : October 12, 2010
INVENTOR(S) : Yongbao Xin et al.

It is certified that error appears in the above-identified patent and that said Letters Patent is hereby corrected as shown below:

Title Page, Item (73) Assignee: should read -- iFire IP Corporation, Oakville, Ontario (CA); Sanyo Electric Co., Ltd., Osaka, (JP) --

Signed and Sealed this
Twenty-eighth Day of June, 2011

David J. Kappos
*Director of the United States Patent and Trademark Office*